Aug. 26, 1952     C. R. KENNEDY     2,608,498
APPARATUS FOR MAKING ANTISKID TIRES AND
METHOD FOR MOUNTING THE SAME

Filed March 29, 1949     2 SHEETS—SHEET 1

Inventor
Chester R. Kennedy
by Roberts, Cushman & Grover
Att'ys.

Aug. 26, 1952     C. R. KENNEDY     2,608,498
APPARATUS FOR MAKING ANTISKID TIRES AND
METHOD FOR MOUNTING THE SAME

Filed March 29, 1949     2 SHEETS—SHEET 2

Inventor
Chester R. Kennedy
by Roberts, Cushman & Grover
Att'ys.

Patented Aug. 26, 1952

2,608,498

UNITED STATES PATENT OFFICE 2,608,498

APPARATUS FOR MAKING ANTISKID TIRES AND METHOD FOR MOUNTING THE SAME

Chester R. Kennedy, Lakeville, Mass.

Application March 29, 1949, Serial No. 84,046

12 Claims. (Cl. 154—14)

This invention relates to apparatus for making anti-skid coverings for pneumatic tires and to a method for mounting the same on the tires.

In my pending applications, Serial No. 8,617, filed February 16, 1948, and Serial No. 25,923, filed May 8, 1948, now Patent 2,570,689 issued October 9, 1951, there are illustrated methods of making anti-skid coverings for pneumatic tires by taking a used, partially worn-out pneumatic tire shoe, cutting it across through its tread portion side walls and beads and then making cut-outs in the tread and portions of the side walls by means of suitable formed dies in accordance with various patterns, as shown in my pending design applications, Serial No. D. 145,864, filed April 21, 1948, now abandoned; Serial No. D. 292, filed January 18, 1949, now Patent D. 158,668 issued May 23, 1950; Serial No. D. 293, filed January 18, 1949, now Patent D. 158,669 issued May 23, 1950; Serial No. D. 294, filed January 18, 1949, now abandoned; and Serial No. D. 295, filed January 18, 1949, now abandoned.

Heretofore all of the cut-outs have been made by hand, using die members and a mallet for driving the dies through the tread at the proper places and in accordance with the particular pattern selected. This is both arduous, dangerous and extremely slow so that it takes a strong man as much as three hours to make the cut-outs in a single tire shoe. Accordingly, the present invention has for its principal objects to provide apparatus for making all of the cut-outs in the tire tread at once, thereby eliminating hand-work and its accompanying dangers, which will effect a much cleaner and more accurate cutting operation, which will operate on casings of various sizes with a minimum of adjustment or replacement of its operating parts, which will perform the cutting out operation in a matter of three to four minutes as contrasted to hand methods of three to four hours, which will be relatively simple and inexpensive to build, and which will be durable and safe to operate.

As illustrated herein, the apparatus has a platform upon which a partially worn out casing may be placed, a die support carrying dies arranged in the desired pattern, and power-operated means for effecting a relative movement of the parts to bring the dies into cutting engagement with the casing and to cut therefrom at one fell swoop the entire number of cut-outs. Preferably the dies are arranged above the casing support in fixed position, and the casing support is moved upwardly with the casing resting thereon centered with respect to the dies. As the support moves up, the casing is forced against the cutting edges of the dies, flattens out, that is, its walls are forced into contact with each other and its tread bent double, whereupon the dies pass through the doubled tread and walls, cutting therefrom the cut-outs which are to be removed according to the preselected pattern. Where the cut-outs are of the kind extending entirely across the tread, the cut-out portion is doubled on itself and is discharged laterally from the die by ejector means in the form of an outwardly and upwardly sloping wall which deflects the springy doubled-up cut-out as it is released from the flattened casing so that it springs upwardly and outwardly away from the apparatus. The dies which make the cut-outs which do not extend across the tread have openings through their upper ends and through the supporting plate so that the cut-out pieces, there being two for each cut, will be forced upwardly through them and through these openings to the top side of the support.

In another aspect the invention contemplates a method of mounting the prepared casings on the pneumatic tire. As carried out, the prepared casing is placed over the inflated tire, the latter being on its wheel, by spreading its walls sufficiently to slip them over the tread and side walls. At this point in the operation the split ends of the casing will be from 8 to 12 inches apart. These ends are then drawn toward each other until the walls of the inflated tire in the gap between the ends begin to bulge noticeably whereupon, while still maintaining the drawing force on the ends of the casing, the inflated tire is partially deflated by letting out a part of its air. Following this the drawing-together force is resumed to bring the ends of the casing into abutting engagement, the ends are secured together by suitable links, such as shown in my aforementioned pending applications, and the pneumatic tire is then reinflated. To facilitate drawing the ends of the casing together without placing undue stresses on local parts of the casing due to frictional engagement of the surfaces, the method includes applying a liberal quantity of lubricant to the surface of the pneumatic tire prior to applying the casing. Furthermore, both during and after the stretching of the casing, the operation may be assisted by shifting the individual tread surfaces between cut-outs along the surface of the tire casing by applying force thereto. This may be effected by driving them along with a mallet or by shifting them with a prying implement.

A simple form of apparatus for effecting the foregoing method includes placing flat plates between the casing and the pneumatic tire near the split ends of the casing which have outwardly projecting lugs so that the lugs extend from the endmost slots, providing traverse screws with traverse blocks for engagement with the lugs, and then rotating the screws to draw the plates and hence the split end of the casing toward each other until the ends abut, whereupon the fastening links may be secured in place.

The invention will now be described in greater detail with reference to the accompanying drawings wherein.

Figure 2:
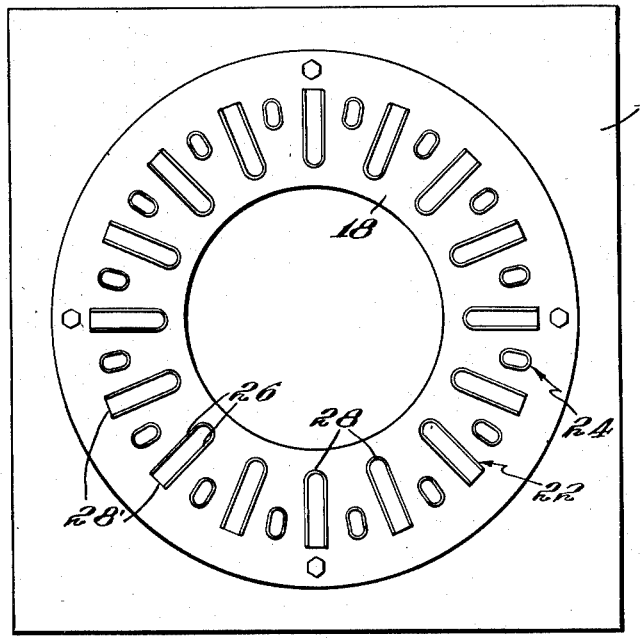
Fig. 2 is a plan view of the die cutting means as seen from the underside looking up on the line 2—2 of Fig. 1.
Figure 1:
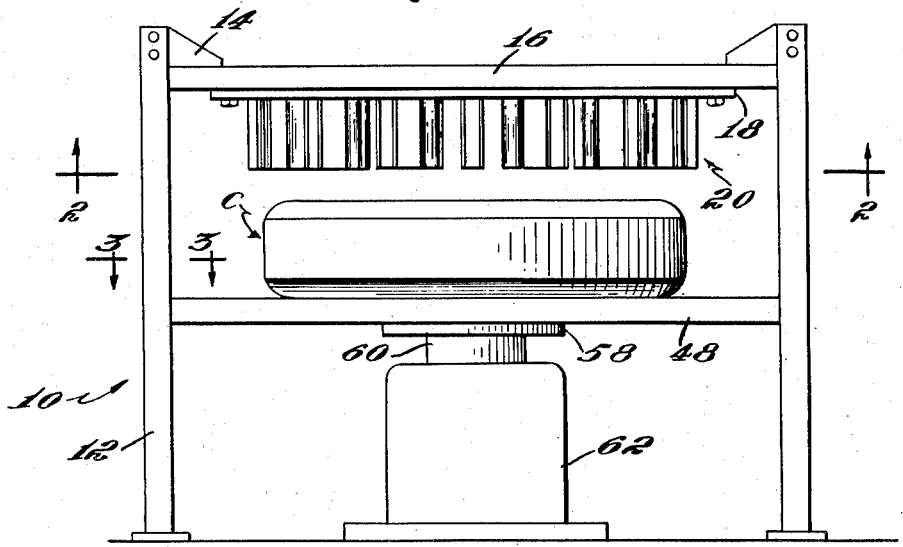
Fig. 1 is a front elevation of the machine showing a casing resting on its support in a position to be operated upon.

Referring to the drawings, the machine 10 is shown as comprised of four vertical legs 12 preferably lagged at their lower ends to the floor and having at their upper ends inwardly directed brackets 14, to the underside of which is fastened a head plate 16 for supporting the dies. To the underside of the head plate there is bolted an annular die plate 18 to which are welded the dies 20, the details of which will now be described.

Figure 4:
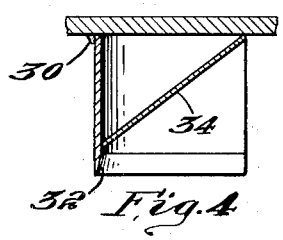
Fig. 4 is a vertical section through an open die fastened to its supporting plate.
Figure 6:
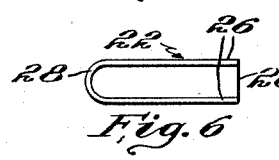
Fig. 6 is a bottom view of the die.

The dies consist of alternately disposed die members 22 and 24 arranged annularly about a common center. Each die 22 is comprised of a U-shaped member (Figs. 4 and 6) having parallel walls 26, a closed curved end wall 28, and an open end 28'. Each die is composed of suitable cutting steel welded at 30 to the underside of the plate 18, and has at its lower end a beveled cutting edge 32. Between the parallel walls 26 there is situated an inclined deflector 34, the lower end of which is vertically spaced from the cutting edge of the closed end wall 28 by an amount at least equal to the thickness of the casing walls, and the upper end of which terminates close to the plate 18. The dies 24 are closed, having parallel sides 36 and curved end walls 38. The die members 24 are secured to the underside of the plate 18 by welding, as shown at 40, are made of a corresponding cutting steel, and have beveled cutting edges 42. Openings 44 and 46 are made through the plate 18 and 16 directly above and concentric with the upper ends of the closed dies, thereby forming a continuous vertical passage from the lower end of the die to the top of the plate 16 through which may be ejected the circular cut-outs.

Figure 9:
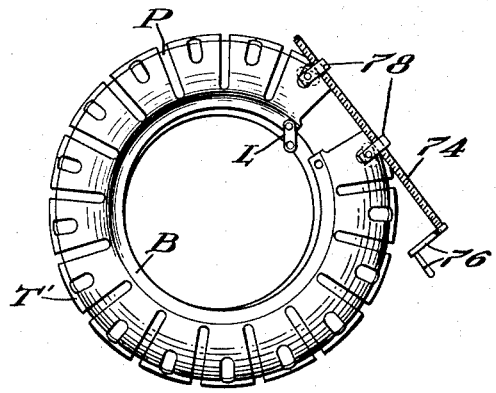
Fig. 9 is a plan view showing the stretching apparatus for applying the precut casing to an inflated pneumatic tire.

The dies 22 are arranged so that their inner closed ends 28 lie substantially tangent to a circle whose radius is greater than the inside radius of any tire casing to be operated upon and with their outer open ends extending beyond the periphery of the casing to be operated upon. The intermediate dies 24 are arranged so that their closed ends lie between the inner circumference and the outer circumference of the casing. It is to be understood, however, that both the dies 22 and 24 may be of different shape and arranged at different positions so as to form the cuts at different parts of the walls and tread portions of the casing. The dies 22 and 24 will make cut-outs corresponding to those illustrated in Fig. 9.

Figure 13:
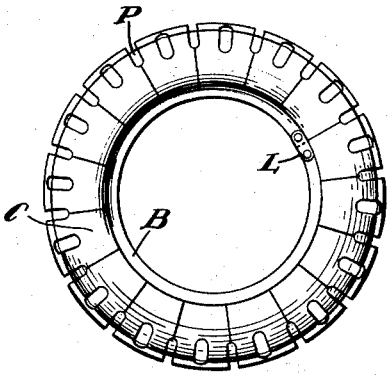
Fig. 13 shows a completely mounted casing with its ends secured together on the pneumatic tire following the method described.
Figure 6A:
Fig. 6a is a bottom view of a modified die with a rearwardly extending cutting blade fixed thereto.
Figure 7:
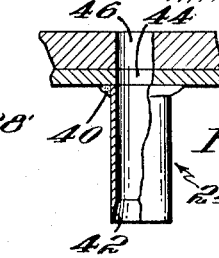
Fig. 7 is a partially sectioned side elevation of a closed die fastened to its supporting plate.
Figure 8:
Fig. 8 is a bottom view of the die shown in Fig. 7.

A modified form of the die 22 is shown in Fig. 6a wherein a blade 68 having a beveled cutting edge is fixed to the closed end 28 thereof. The blade 68 will extend radially inward toward the center and is adapted to cut radially extending incisions in the wall of the tire inwardly toward the bead of the casing but not through the bead. The casing shown in Fig. 13 illustrates the use of this form of die wherein single cuts extend inwardly from the bottom of alternate cut-outs toward the beads.

Figure 3:
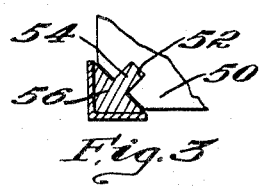
Fig. 3 is a fragmentary horizontal section at one corner showing guide means for controlling the vertical movement of the casing support.

Below the dies 20 there is situated a plate 48 for supporting the casing which is to be operated upon. The plate 48 has beveled corners 50 (Fig. 3) in which there are formed ways 52 for reception of tongues 54 formed on strips 56 fastened within the angle of the legs 12. This arrangement provides for accurate guided movement of the plate 48 vertically toward the dies 20. The support plate 48 is fastened to a flange 58 at the upper end of a piston 60 which forms part of a conventional hydraulic piston and cylinder assembly 62 situated on the floor beneath the support plate 48. Admission of fluid to the piston and cylinder assembly 62 will raise the support plate 48 and the casing C supported thereon vertically into engagement with the dies 20 carried by the head 16. To center the casing with respect to the dies there is fastened to the top side of the supporting plate 48 (Fig. 5) a centering platform 64 having an annular sloping edge 66. When the casing is placed on the supporting plate 48 its inner circumference defined by its beads B will center themselves and hence the casing on the centering platform 64. It is evident that the centering platform 64 may be readily removed and replaced by another of larger or smaller circumference so as to adapt the machine to casings of different size.

Figure 5:
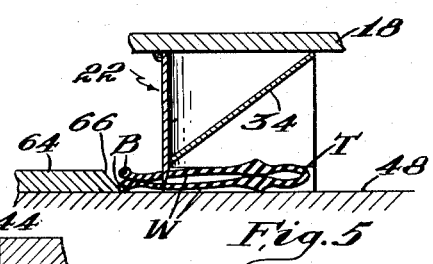
Fig. 5 is a corresponding vertical section through a die and a portion of the support for the casing showing the casing collapsed with the die penetrating it.

In the operation of the apparatus when the casing C is moved upwardly into engagement with the dies, the casing itself is first flattened, as shown in Fig. 5, so that the tread T is bent double upon itself and the walls W are pressed into contact with each other, whereupon further movement causes the cutting edges of the dies 22 and 24 to penetrate through the walls and the tread. In the case of the dies 22, the open ends of which extend beyond the doubled-over tread when the penetration is complete, the severed piece will, by its own resilience, spring upwardly away from the casing into engagement with the deflector plate 34. Since the casing is quite resilient and the doubled piece tends to straighten out it springs upwardly with considerable force against the deflector plate 34 which will deflect the piece to one side of the cutting dies, thereby clearing it from the cutting dies. As for the dies 24, the punched-out pieces will be forced upwardly within the die passages, and as they accumulate will be forced through the openings 44 and 46 to the top of the plate 16 from which they may be brushed by the operator to out-of-the-way positions. The punched-out pieces will not fall down through the dies so as to get in the way of succeeding operations due to the fact that they have sufficient frictional engagement with the walls of the dies to be frictionally retained therein and only to be expelled by the accumulation of succeeding pieces therebeneath which force them upwardly.

Figure 10:
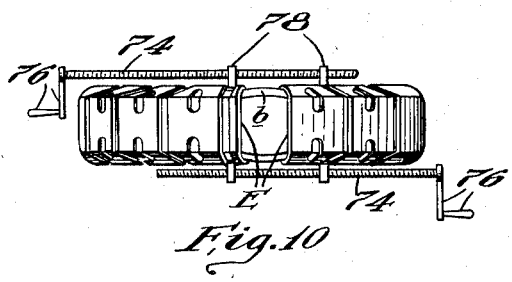
Fig. 10 is an edge elevation of Fig. 9 showing the arrangement of the stretching apparatus for applying the casing to the pneumatic tire.
Figure 12:
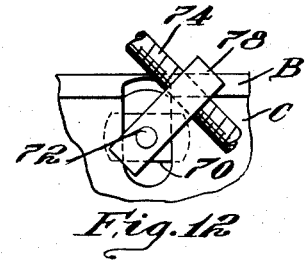
Fig. 12 is a plan view of the details of the stretching apparatus looking down on Fig. 11.
Figure 11:
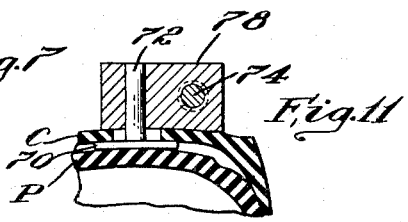
Fig. 11 is a detail in section showing a plate interposed between the pneumatic tire and the casing with a pin thereon for engagement with the stretching apparatus.

Having cut a casing in accordance with the foregoing description on the apparatus provided, it is next applied to an inflated pneumatic tire P, as will now be described. First the inflated tire P is coated with a liberal quantity of some lubricant. While many different kinds of lubricant will serve the purpose, it is preferred to use a fairly heavy oil, for example, crank-case oil. A used crank-case oil, which is normally discarded, may be employed for this purpose. It is to be understood, however, that a light grease or that even water may be used for this purpose, since water has a definite wetting effect on rubber-to-rubber contact which reduces the friction therebetween. Having applied the lubricant to the walls and tread of the pneumatic tire, the split casing is then applied thereto by spreading its walls W—W so as to embrace the pneumatic tire. At this point the split ends E (Figs. 9 and 10) of the casing are from eight to twelve inches apart. Plates 70 (Figs. 11 and 12), having pins 72 fastened thereto, are then placed between the inside of the casing and the pneumatic tire adjacent each of its split ends E—E and at each side of the tire so that the pins extend outwardly through the last cut-outs formed therein. Stretching devices are then applied to each pair of pins 72 at opposite sides of the tire. Each device comprises a pair of screws 74 having crank handles 76 and traverse blocks 78. The devices are placed at opposite sides of the casing with the traverse blocks 78 engaged with the pins 72. The traverse screws are then rotated to draw the blocks 78 and hence the split ends E—E of the casing toward each other. During movement of the split ends of the casing toward each other, the sliding action between the inner surface of the casing and the outer tread surface and wall portions of the pneumatic tire is assisted by striking the tread surfaces of the casing with mallets. The split ends of the casing are drawn toward each other until the walls of the pneumatic tire begin to noticeably bulge, as shown in Fig. 10 at b. At this point the drawing is discontinued and the pneumatic tire is wholly or partially deflated by allowing the air therein to escape. Following this the screws are then rotated again to draw the split ends E toward each other until they are in abutting engagement. The place at which the bulge b begins to occur is approximately four to six inches before the split ends come together. When the split ends are brought into abutting engagement, links L, at opposite sides of the casing connected thereto by bolts in accordance with the aforementioned pending applications, are secured to hold the abutting ends of the casing together. The screws are then rotated in the reverse direction to slack up on the blocks 78, whereupon they are removed from the pins 72 and then the plates 70 are pulled from the slots. The pneumatic tire is then reinflated to its original pressure, whereupon by means of a mallet and/or a prying device the tread sections T' (Fig. 9) of the casing are forced along the tread portion of the pneumatic tire so that they will occupy substantially equal spacings throughout.

It should be understood that the present disclosure is for the purpose of illustration only and that this invention includes all modifications and equivalents which fall within the scope of the appended claims.

I claim:

1. A method of assembling an anti-skid casing on a normally inflated pneumatic tire, said casing having been previously prepared by cutting slots transversely of its tread, the end portions of which extend radially inward along the walls of the casing and the casing being split entirely across at one point, comprising the steps of spreading the walls of the split casing and placing it on the inflated tire, drawing the split ends toward each other until the wall of the inflated tire begins to bulge noticeably, deflating the pneumatic tire, drawing the split ends into contact on the deflated tire, securing the ends with fastening elements, and then reinflating the pneumatic tire.

2. A method of assembling an anti-skid casing on a normally inflated pneumatic tire, said casing having been previously prepared by cutting slots transversely of its tread to provide spaced, transversely extending tread portions and the casing being split entirely across at one point, comprising the steps of spreading the walls of the split casing and placing it on the inflated tire, drawing the split ends toward each other until the walls of the inflated tire begin to bulge noticeably, deflating the pneumatic tire, drawing the split ends into contact on the deflated tire, securing the ends with fastening means, reinflating the pneumatic tire and then shifting the individual tread portions between the slots around the tire until they are substantially equally spaced.

3. A method of assembling an anti-skid casing on a normally inflated pneumatic tire, said casing having been previously prepared by cutting slots transversely of its tread, the end portions of which extend radially inward along the walls of the casing and the casing being split entirely across at one point, comprising the steps of applying a lubricant to the tread and walls of the inflated tire, spreading the walls of the split casing and applying it to the inflated tire, drawing the split ends toward each other until the walls of the inflated tire begin to bulge noticeably, deflating the pneumatic tire, drawing the split ends into contact on the deflated tire, securing the ends with fastening elements and then reinflating the pneumatic tire.

4. A method of assembling an anti-skid casing on a normally inflated pneumatic tire, said casing having been previously prepared by cutting slots transversely of its tread, the end portions of which extend radially inward along the walls of the casing and the casing being split entirely across at one point, comprising the steps of applying a thick coating of heavy oil to the tread and walls of the inflated tire, spreading the walls of the split casing and placing it on the inflated tire, drawing the split ends toward each other until the walls of the inflated tire begin to bulge noticeably, deflating the pneumatic tire, drawing the split ends into contact on the deflated tire, securing the ends with fastening elements and then reinflating the pneumatic tire.

5. A method of assembling an anti-skid casing on a normally inflated pneumatic tire, comprising the steps of preparing a casing of the same size as the pneumatic tire to which it is to be applied by cutting slots transversely of its tread, the end portions of which extend radially along the walls of the casing and the casing being split entirely across at one point, spreading the walls of the split casing and applying it to the inflated tire, initially drawing the split ends toward each other until the inflated tire begins to bulge, deflating the tire, finally drawing the split ends into contact on the deflated tire, securing the ends with fastening elements and then reinflating the pneumatic tire.

6. A method of assembling an anti-skid casing on a normally inflated pneumatic tire, comprising the steps of preparing a casing by cutting slots transversely of its tread, the end portions of which extend radially inward along the walls of the casing, splitting the casing entirely across at one point, spreading the walls of the split casing and placing it on the inflated tire, said casing being so selected that when placed on the inflated tire the split ends are approximately 10 inches apart, drawing the split ends toward each other until the walls of the inflated tire begin to bulge noticeably, deflating the pneumatic tire, drawing the split ends into engagement on the deflated tire, securing the ends with fastening elements and then reinflating the pneumatic tire.

7. A method of assembling an anti-skid casing split to provide ends separable to permit circumferential distention of the casing on a normally inflated pneumatic tire comprising spreading the walls of the casing and applying it to the inflated tire, placing a plate having a stud thereon between the casing and tire with the stud extending through the wall of the casing from the inside outwardly, there being one at each side and at each split end of the casing, contracting the casing about the tire by drawing the ends thereof toward each other from a spacing of approximately 10 to 12 inches to a spacing of approximately 4 to 6 inches while the tire is still inflated, deflating the tire, drawing the ends toward each other again until the split ends of the casing abut, and bridging the abutting ends with fastening means at each side.

8. A method of assembling an anti-skid casing split to provide ends separable to permit circumferential distention of the casing on a normally inflated tire comprising spreading the walls of the casing and applying it to the tire, placing a plate having a stud thereon between the casing and tire so that its stud extends through the wall of the casing from the inside outwardly, there being one at each side and at each split end of the casing, applying to each pair of studs blocks carried by a common screw, rotation of which will draw the blocks toward each other, rotating the screws to draw the blocks toward each other until the spacing between the split ends of the casing is approximately 4 to 6 inches while the tire is still inflated, deflating the tire, again drawing the studs toward each other until the split ends of the casing are abutting, bridging the abutting ends with fastening elements at each side, removing the studs and screws and reinflating the tire.

9. A method of assembling an anti-skid casing split to provide ends separable to permit circumferential distention of the casing on a normally inflated pneumatic tire comprising the steps of preparing a casing by cutting slots transversely of its tread to provide spaced tread sections, spreading the walls of the casing and applying it to the inflated tire, placing a plate, having a stud thereon between the casing and tire so that the stud extends through the wall of the casing from the inside outwardly, at each side and at each split end of the casing, applying stretching means to the studs to draw the ends of the casing toward each other, progressively drawing the split ends toward each other and while so drawing them shifting individual tread sections between the slots along the tread of the tire until the split ends are approximately 4 to 6 inches apart, deflating the tire, drawing the split ends into abutting engagement, joining the abutting ends with fastening elements consisting of inner and outer link plates joined to each other by through bolts passing through the walls of the casing and then reinflating the tire.

10. In a machine for making anti-skid casings, a plurality of dies arranged annularly about a common center, a support for the casing and means for effecting movement of the dies and support to mash the casing flat against the support so that the walls coincide and the tread is bent double upon itself and then to cut through the double thickness, each die, having U-shaped radially extending walls terminating at their lower ends in cutting edges, said cutting edges originating between the bead and the tread and extending beyond the outer extremity of the bent tread so as to sever from the casing pieces leaving symmetrical openings therein and a deflector situated between the parallel walls rising from the inner closed cutting edge, for expelling the severed piece as it springs free upon severance outwardly from between the walls of the die.

11. In a machine for making anti-skid casings, a plurality of U-shaped dies arranged annularly about a common center, said dies having parallel walls closed at one end and open at the other, a support for the casing and means for effecting movement of the dies and support to mash the casing flat against the support so that the walls coincide and the tread is bent double upon itself and then to cut through the double thickness, each die having radially extending cutting edges originating between the bead and the tread and extending beyond the outer extremity of the bent tread so as to sever from the casing pieces leaving symmetrical openings therein and an inclined deflector situated between the parallel walls of the cutter rising from its inner closed end upwardly and outwardly therefrom.

12. In a machine for making anti-skid casings comprising a plurality of U-shaped dies arranged annularly about a common center, said dies having parallel walls closed at one end and open at the other, a support for the casing and means for effecting movement of the dies and support to mash the casing flat against the support so that the walls coincide and the tread is bent double upon itself and then to cut through the double thickness, each die having radially extending cutting edges at the lower extremity of the walls originating between the bead and the tread and extending beyond the outer extremity of the bent tread so as to sever from the casing pieces leaving symmetrical openings therein, and an inclined deflector in each die, the lower end of which is vertically spaced from the inner closed end of the cutting edge by an amount at least equal to twice the casing wall thickness and which rises therefrom upwardly and outwardly toward the open end.

CHESTER R. KENNEDY.

REFERENCES CITED

The following references are of record in the file of this patent:

UNITED STATES PATENTS

| Number | Name | Date |
| --- | --- | --- |
| 72,903 | Rathbone | Dec. 31, 1867 |
| 1,170,154 | Hennig | Feb. 1, 1916 |
| 1,390,117 | Freeman | Sept. 6, 1921 |
| 1,578,803 | Comey | Mar. 30, 1926 |
| 1,771,496 | Leguillon | July 29, 1930 |
| 1,793,603 | Frederick | Feb. 24, 1931 |
| 1,978,051 | MacDonald | Oct. 23, 1934 |
| 2,038,406 | Benoit et al. | Apr. 21, 1936 |
| 2,067,083 | Gregory et al. | Jan. 5, 1937 |
| 2,076,436 | Nelson | Apr. 6, 1937 |
| 2,211,051 | Bolling | Aug. 13, 1940 |
| 2,315,340 | Knudsen | Mar. 30, 1943 |
| 2,345,518 | Wendel | Mar. 28, 1944 |

FOREIGN PATENTS

| Number | Country | Date |
| --- | --- | --- |
| 817,403 | France | May 24, 1937 |